United States Patent
Manninen (10) Patent No.: US 9,487,911 B2
(45) Date of Patent: Nov. 8, 2016

(54) PROFILED SEAMING ELEMENT FOR INDUSTRIAL TEXTILES

(75) Inventor: Allan R. Manninen, Stittsville (CA)

(73) Assignee: AstenJohnson, Inc., Charleston, SC (US)

( * ) Notice: Subject to any disclaimer, the term of this patent is extended or adjusted under 35 U.S.C. 154(b) by 423 days.

(21) Appl. No.: 14/237,592

(22) PCT Filed: Jul. 26, 2012

(86) PCT No.: PCT/CA2012/000701
§ 371 (c)(1),
(2), (4) Date: Feb. 7, 2014

(87) PCT Pub. No.: WO2013/023272
PCT Pub. Date: Feb. 21, 2013

(65) Prior Publication Data
US 2014/0199510 A1    Jul. 17, 2014

(51) Int. Cl.
*D06H 5/00* (2006.01)
*B65H 69/06* (2006.01)
(Continued)

(52) U.S. Cl.
CPC ............... *D06H 5/00* (2013.01); *B29C 65/56* (2013.01); *B32B 3/04* (2013.01); *B32B 3/08* (2013.01); *B32B 3/28* (2013.01); *B65H 69/06* (2013.01); *D21F 1/0054* (2013.01); *D21F 7/10* (2013.01); *F16G 3/02* (2013.01); *B32B 3/266* (2013.01); *B32B 27/08* (2013.01); *B32B 27/281* (2013.01); *B32B 27/34* (2013.01); *B32B 27/36* (2013.01); *F16G 3/04* (2013.01); *Y10T 428/197* (2015.01); *Y10T 428/24314* (2015.01)

(58) Field of Classification Search
None
See application file for complete search history.

(56) References Cited

U.S. PATENT DOCUMENTS 3,323,226 A    6/1967    Beaumont et al.
2008/0295306 A1    12/2008    Despault

FOREIGN PATENT DOCUMENTS

CA        2685623 A1 *  10/2010  ........... D21F 1/0054
CA    WO 2011069259 A1 *  6/2011  ......... B29C 65/5035
WO       2011069259 A1    6/2011

OTHER PUBLICATIONS

International Search Report and Written Opinion dated Nov. 1, 2012 for International Application No. PCT/CA2012/000701, International Filing Date Jul. 26, 2012 (8-pages).

*Primary Examiner* — David Sample
*Assistant Examiner* — Donald M Flores, Jr.
(74) *Attorney, Agent, or Firm* — Christopher & Weisberg, P.A.

(57) ABSTRACT

A seaming element for an industrial textile, a textile with seaming elements, and a method. The seaming element has first and second end regions, a fold line in an intermediate fold region, and outer and inner surfaces. Each end region comprises slits extending from the outer surface through to the inner surface, defining protrusions which provide a profile to at least one of the surfaces. Apertures aligned along the fold line define a plurality of land areas. When the seaming element is folded along the fold line, the land areas form a plurality of loops defining a channel. When the seaming element is secured at each end region to a first end of the industrial textile, the loops are interdigitatable with corresponding loops on a compatible seaming element at a second end of the industrial textile, to define a single aligned channel to receive a securing means.

19 Claims, 13 Drawing Sheets (51) Int. Cl.
*B29C 65/56* (2006.01)
*D21F 7/10* (2006.01)
*B32B 3/04* (2006.01)
*B32B 3/08* (2006.01)
*B32B 3/28* (2006.01)
*D21F 1/00* (2006.01)
*F16G 3/02* (2006.01)
*B32B 3/26* (2006.01)
*F16G 3/04* (2006.01)
*B32B 27/08* (2006.01)
*B32B 27/36* (2006.01)
*B32B 27/28* (2006.01)
*B32B 27/34* (2006.01)

PROFILED SEAMING ELEMENT FOR INDUSTRIAL TEXTILES

FIELD OF THE INVENTION

The invention relates to seaming elements for industrial textiles for filtration, conveyance and similar purposes, and industrial textiles including such seaming elements. In particular, the invention relates to such seaming elements integrated into industrial textiles, more particularly where the seaming element and the textile are each of profiled polymeric construction, e.g. formed from a slit and embossed film.

BACKGROUND OF THE INVENTION

Industrial textiles intended for continuous process and conveying applications, such as filtration, papermaking and the like, are frequently made in lengths of more than 100 ft. (33 m) and are often joined on the machine for which they are intended. The seam is a critical fabric component, and its properties should ideally be as continuous with the fabric as possible. That is to say, the seam should not introduce a discontinuity into the fabric once it is closed and the textile is rendered endless. The seam should also be easily closable by the machine operators during installation, and should be of high strength so that fabric integrity is optimized. Over the years, a great variety of seam constructions have been developed which meet these requirements to varying degrees. In the past, the vast majority of industrial textiles used for papermaking and filtration have been either wholly or partially woven structures, and the seams for these fabrics were typically prepared as extensions of the textile body. Pin type seams in particular have been found to offer various advantages in terms of maintaining fabric properties, and minimizing discontinuity, while providing a high strength join which is simple to close during installation.

With more recent advances in polymer structures and engineering, it has now become feasible to produce wholly nonwoven industrial textiles for filtration applications. These nonwoven fabrics can be formed from yarn arrays or similar arrangements of discrete fibers or, more recently, from polymer films. For example, it has been proposed in WO 2011/069259 (Manninen) to assemble industrial textiles from one or more layers of film which has been selectively slit and embossed so as to provide permeability and integrity. The film fabric disclosed in the '259 application can be joined with either a seaming element such as is described in WO 2010/121360, or a hinge type seam as disclosed by Lacroix et al. WO 2011/069258. While both of these seam constructions may be suitable for use in a variety of situations, a need still exists for a seam structure which is of high strength, maintains continuity with respect to fabric properties and is easily joined on the machine for which the fabric is intended. Ideally, such a seam construction should also be applicable to both woven and nonwoven textiles. The seaming elements of the present invention address these needs in a simple, elegant manner.

It is known to provide for seaming of fabrics by using punched, notched or similarly serrated openings between which are located joining loops or analogous arrangements. For example, FR 929951 (Nivoix) discloses a notched, U-shaped hinge seam component comprised of metal or nylon for attachment to a transmission belt so as to render it endless; and DE 4314356 (Melies) discloses a pressed film connection to connect the ends of rotating pressed films used to feed workpieces into presses, a plurality of mutually engaging flaps being created at each of the opposing ends of the belt, to receive a connecting rod to join the ends.

GB 1 266 719 (Wilson) describes a heat-shrinkable closure sleeve, constructed from a notched polymeric material having a row of apertures along parallel opposing edges, the apertures of one edge being staggered in relation to those in the opposing edge. The sheet is folded along each row of apertures and then bonded to provide a plurality of loops capable of receiving a connecting member.

U.S. Pat. No. 2,005,979 (Milnes) discloses a dryer fabric or felt which is rendered endless by cutting interfitting loops from the opposing fabric ends by first folding the ends back upon themselves, and then cutting out notches to form the loops, the opposing ends being joined together by means of a retaining key, or pintle. U.S. Pat. No. 3,309,790 (MacBean) discloses a similar seam construction to that of Milnes except that the key, or pintle, is perforated to maintain porosity (permeability) across the width of the fabric at the seam, and the notches and projections may be coated with a plastic material to bond the folded over portions.

U.S. Pat. No. 3,323,226 (Beaumont) discloses a papermaker's dryer fabric formed from a plurality of rectangular perforated polymeric sheets of film which are joined together by overlapping the sheets and ultrasonically welding them. The fabric may be seamed by folding back the ends of the fabric, stitching them in place, and then forming notches across the width of the belt. The resulting loops and notches can be brought together and interleaved, and a rod or pintle inserted through the loops to create an endless construction.

U.S. Pat. No. 4,911,683 (Legge) discloses a nonwoven fabric construction including one or more layers of batt material in which the ends to be joined may be entirely devoid of MD oriented yarns, the fabric ends being folded and subsequently notched to form a series of projections which can be intermeshed to form a seam.

U.S. 2008/0295306 (Despault) discloses a seam for a papermakers fabric comprised of intermeshing indentations and land areas located at each of the opposing ends of the fabric. The land areas are shaped to intermesh with the indentations at the second opposing end and then joined using a pintle.

SUMMARY OF THE INVENTION

It has now been found that seaming elements can be provided as two layer components, preferably constructed from a polymeric film, and having apertures along a fold line between the two layers, and with profiling of the layers. Land areas along the fold line between the apertures can be configured to provide a set of loops across the fold line, similar to the known loops of seam areas in woven industrial textiles. When the seaming element is affixed to one seamable end of an industrial textile, the loops on the seaming element can be interdigitated with loops on a second seaming element affixed to an opposing seamable end of the textile. The second seaming element can be of any configuration, provided that the loops and intervening spaces, and the total thickness of the two layers, of the seaming elements are of compatible dimensions, so that different configurations can be selected if appropriate to provide optimal properties to the eventual seam and seam area.

The seaming elements of the invention are suitable for a large variety of industrial textiles, particularly textiles constructed of polymeric film, and more particularly having at least one profiled layer. The profiling of the seaming elements can be, but is not necessarily, the same as the profiling of the body of the textile itself The seaming elements of the invention are especially suitable for use with the textiles of WO 2011/069259, those textiles being constructed of two or more layers of a bi-axially oriented polymeric film to which contouring is provided by a combination of an embossing or similar process so as to raise portions of the film above its general plane, and form corresponding slits to create apertures at the raised portions, the film layers being bonded together at selected interior locations to form a fully integrated film fabric. The seaming elements of the invention are preferably formed from polymers which would be suitable for use in industrial textiles, such as polyethylene terephthalate (PET) and other polyesters, polyphenylene sulphide (PPS), polyetheretherketone (PEEK) and the like. Preference is presently given to PET and in particular bi-axially oriented hydrolysis stabilized PET and similar polymer films such as are described by Manninen in CA 2,778,513, or oriented, multi-layer thermoplastic polymer films comprising at least two thermoplastic polymeric layers in which at least one of the layers includes a radiation absorbing material such as are described by Manninen in CA 2,758,622.

The seaming elements of the invention can advantageously be constructed integrally with those and other textiles where the seaming elements and the textile body have compatible or identical profiling, and are to be constructed of the same or similar compatible materials.

The invention therefore seeks to provide a seaming element for an industrial textile having first and second ends, the seaming element comprising a body having a first end region, a second end region and an intermediate fold region, opposing first and second lateral edges, an outer first surface and an inner second surface, wherein (i) each end region comprises a plurality of slits extending from the outer surface through to the inner surface wherein adjacent pairs of the slits define land areas therebetween and selected ones of the land areas comprise protrusions extending from at least one of the outer surface and the inner surface to form a profile to the respective surface;
(ii) the intermediate fold region comprises a fold line extending between the first and second lateral edges, and a plurality of apertures mutually aligned along the fold line to define a plurality of land areas therebetween such that when the body is folded along the fold line, the land areas form a plurality of loops defining a channel;
(iii) the seaming element is constructed and arranged to be secured at each of the first and second end regions directly to the first end of the industrial textile; and
(iv) selected ones of the plurality of loops are alignable and interdigitatable with corresponding loops on a compatible seaming element provided to the second end of the industrial textile, to define a single aligned channel to receive a securing means.

Preferably, the seaming element is constructed of a polymeric film.

Preferably, the slits are constructed and arranged to provide aligned rows of protrusions, wherein the protrusions of each row are offset from the protrusions of adjacent rows. However, depending on the intended end use of the finished fabric to be seamed with the element, the protrusions can be aligned in a mutually parallel arrangement, which would for example facilitate assembly in the case of narrow panels of the film.

Preferably, the apertures have a configuration selected from substantially rectangular and substantially elliptical, including variations from those configurations; for example, a substantially rectangular aperture can be provided with rounded corners, or indentation or concave curvature to the opposing sides to provide a taper to the sides of the aperture in a direction towards the fold line. Other aperture shapes can also be selected, provided that they allow for effective interdigitation of the loops of the corresponding seaming element.

Preferably, the seaming element is constructed and arranged to be secured to the industrial textile by a means selected from bonding and mechanical means, in which case preferably at least one of the end regions of the seaming element comprises a bonding strip securable to the industrial textile. Optionally, the industrial textile comprises an interior third layer and the seaming element is constructed and arranged to be secured to the third layer by a means selected from bonding and mechanical means.

Preferably, the securing means is a pintle. Optionally, the seaming element further comprises a reinforcement means provided to the inner surface at the fold region.

Optionally, protrusions on the inner surface of the first end region are selectively secured to the inner surface of the second end region, and protrusions on the inner surface of the second end region are selectively secured to the inner surface of the first end region.

The invention further seeks to provide an industrial textile for conveying in an industrial process, having a pair of seamable edges, wherein at least one of the seamable edges comprises a seaming element according to the invention.

Preferably, the industrial textile is constructed of a polymeric film, and more preferably is constructed of material selected from at least one of polyethylene terephthalate, polyphenylene sulphide, multi-layer laser weld enabled film, and hydrolysis stabilized polymer film.

Preferably, the industrial textile has a textile body comprising at least one layer having an upper surface and a lower surface; and a plurality of textile body slits extending from the upper surface through to the lower surface wherein adjacent pairs of the textile body slits define land areas therebetween, and selected ones of the land areas comprise protrusions extending from at least one of the upper surface and the lower surface of the layer to form a profile to the respective surface. In this case, preferably the textile body slits are constructed and arranged to provide aligned rows of protrusions, wherein the protrusions of each row are offset from the protrusions of adjacent rows. However, as noted above, the protrusions can alternatively be aligned in a mutually parallel arrangement.

Optionally, the industrial textile including at least one seaming element of the invention as described above comprises at least two layers, and (i) the second end region of the seaming element comprises an extended region extending beyond the first end region of the seaming element in a direction measured from the fold line;
(ii) selected ones of protrusions on the inner surface of the first end region are secured to the inner surface of the second end region, and selected ones of protrusions on the inner surface of the second end region are secured to the inner surface of the first end region; and
(iii) selected ones of protrusions on the inner surface of the extended region of the second end region are secured to an inner surface of a first layer of the textile, and protrusions on the inner surface of the first layer of the textile are selectively secured to the inner surface of the extended region of the second end region.

In an aspect of this embodiment, the at least one seaming element is integrally constructed with the textile body.

The invention further seeks to provide a method of making a seam for an industrial textile, the industrial textile having a pair of seamable edges, the method comprising the steps of
(a) providing a first seaming element according to the invention to the first of the pair of seamable edges;
(b) providing a second seaming element to the second of the pair of seamable edges, the second seaming element comprising a plurality of loops constructed and arranged to be alignable and interdigitatable with the plurality of loops of the first seaming element;
(c) bringing free edges of the first and second seaming elements together, interdigitating the plurality of loops of the first seaming element with the plurality of loops of the second seaming element to define a channel; and
(d) providing a securing means to the channel to secure the seam.

Optionally, the industrial textile comprises at least two layers, and the method further comprises selectively securing protrusions on at least one surface selected from the inner surface of the first end region, the inner surface of the second end region and the inner surface of at least one layer of the textile to at an opposing one of the at least one surface.

BRIEF DESCRIPTION OF THE DRAWINGS

The invention will now be described with reference to the drawings, in which.

DETAILED DESCRIPTION OF THE DRAWINGS

Figure 1:
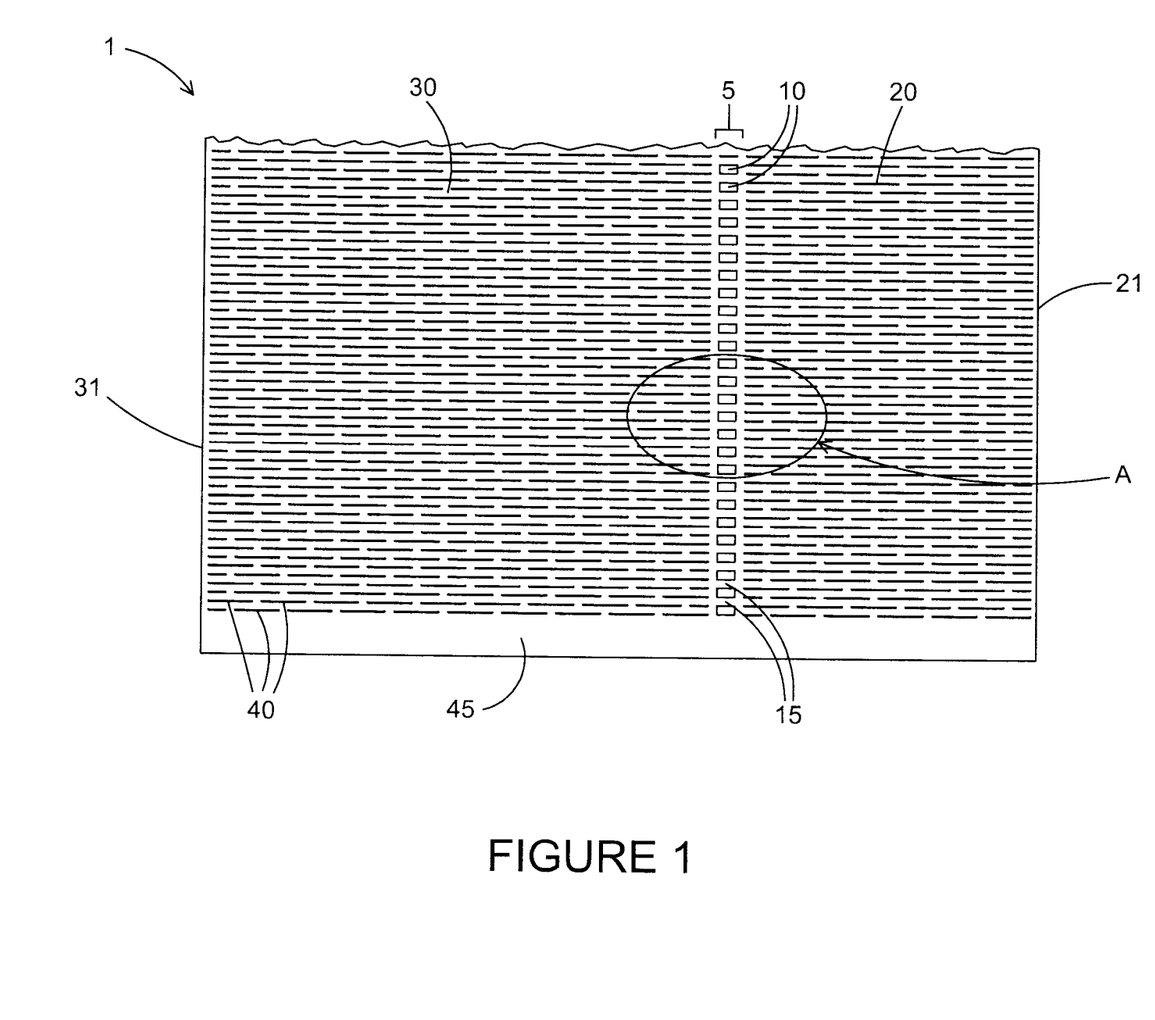
FIG. 1 is a top view of a seaming element in an embodiment of the invention before folding.
Figure 2:
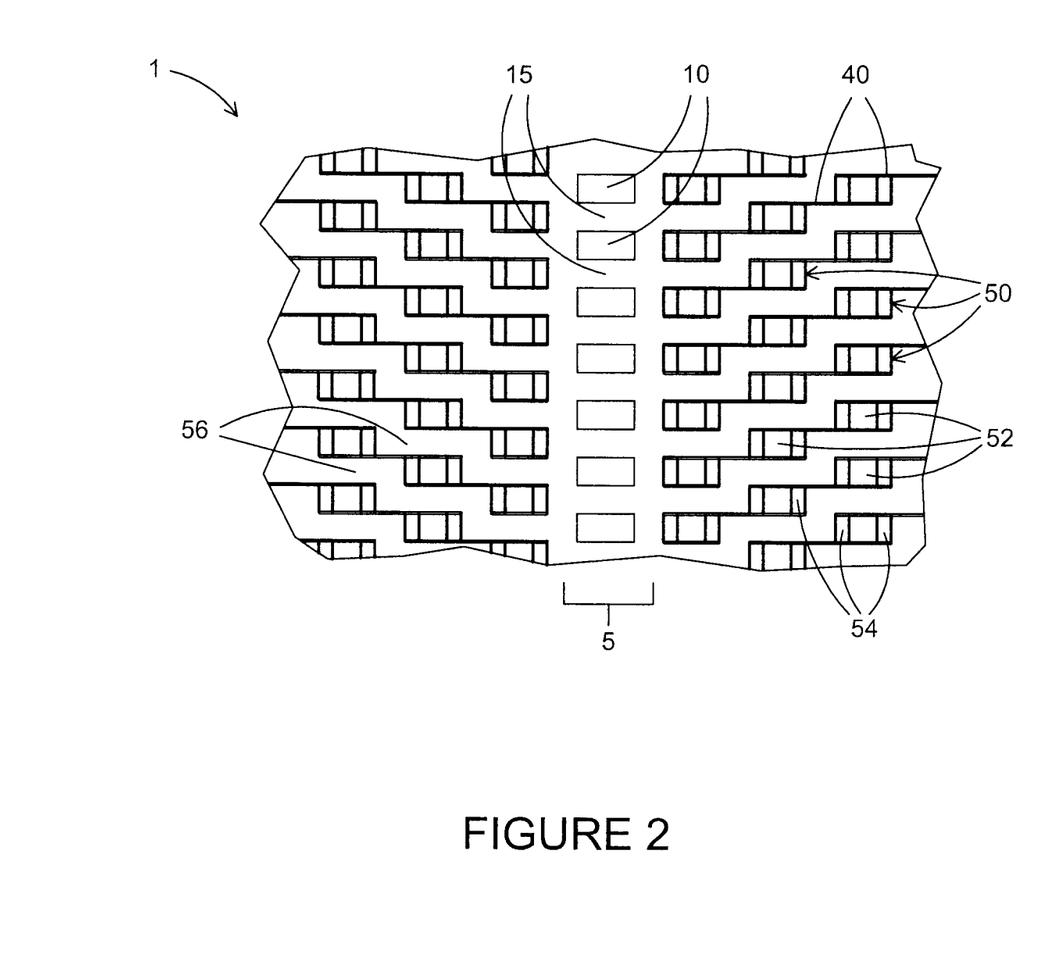
FIG. 2 is an enlarged partial view of the fold region of a profiled seaming element of the invention before folding.
Figure 3:
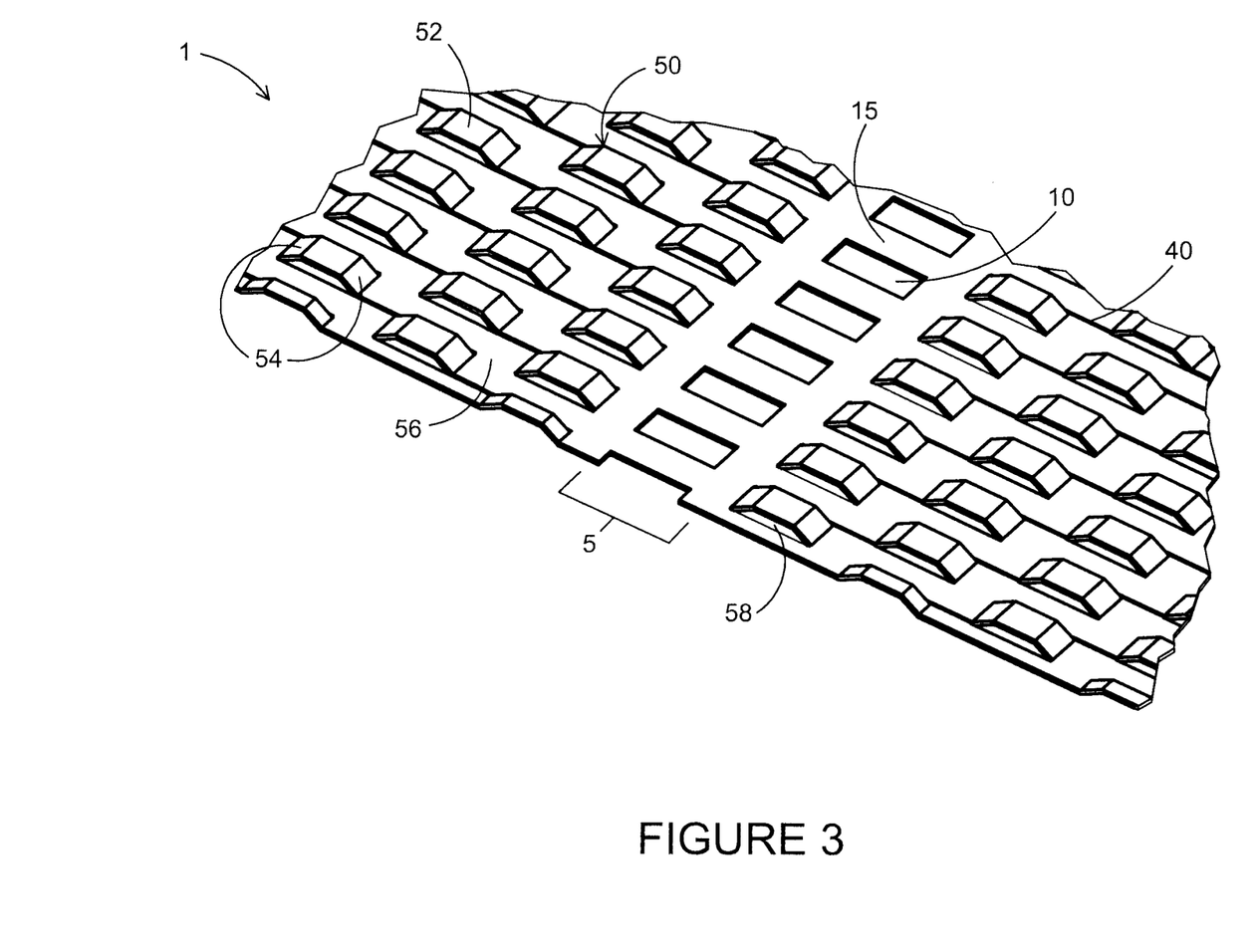
FIG. 3 is a perspective partial view of the fold region of the profiled seaming element of FIG. 3.

Referring to FIGS. 1 to 3, a seaming element 1 in a first embodiment of the invention is shown. The seaming element 1 comprises a polymeric film having a first end region 20 with end edge 21, and a second end region 30 with end edge 31. Each of end regions 20, 30 is provided with a plurality of slits 40, in a selected pattern. Between the two end regions 20 and 30, fold region 5 is provided with a row of apertures 10, mutually aligned and spaced apart so as to define land areas 15 between adjacent apertures. At the side edges of seaming element 1, optionally an uncut region can be provided, such as edging strip 45, for facilitating manufacture and optional removal after folding and setting of seaming element 1, as discussed further below.

FIGS. 2 and 3 are respectively an enlarged planar view and an enlarged perspective view of part of seaming element 1 exemplified by the area shown in FIG. 1 at the detail location A. From FIGS. 2 and 3, it can be seen that selected areas of the polymeric film between adjacent slits 40 have been pressed, for example by an embossing process, to form a plurality of protrusions 50, separated by land areas 56. As best seen in FIG. 3, each protrusion 50 in this embodiment comprises an upper surface 52 and two sides 54. The resulting profiling of seaming element 1 allows for fluid flow, for example liquid drainage or air flow, through the spaces 58 provided under the elevated protrusions between the associated slits 40.

Figure 13:
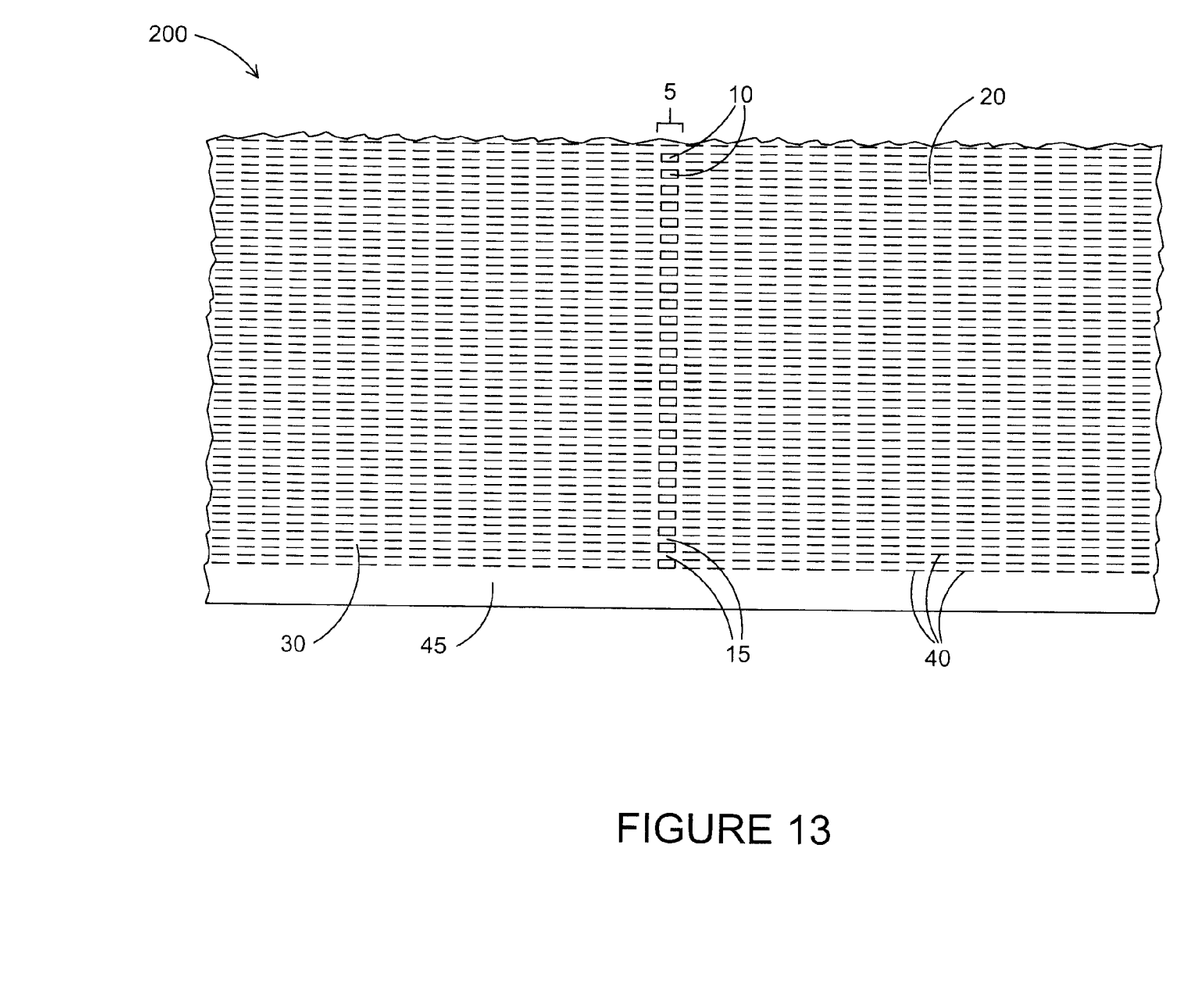
FIG. 13 is a top view of the fold region in a seam area of a textile in an embodiment of the invention.

For the seaming elements of the invention, the profiling patterns and dimensions can be selected according to the intended end use of the seaming elements and the associated industrial textiles, and the specific properties required or desired for the seaming elements. For example, as shown in FIG. 13, the seaming element can be provided as an integral part of a film which has been slit and embossed in a manner similar to that described in WO 2011/069259. In the seaming element 1 as shown in FIGS. 1 to 3, each of the slits in each row of slits is offset by one-half of its length from each of the slits in the adjacent row, which avoids continuity of land areas across the entire width of the seaming element, thereby allowing for imparting to the film some of the characteristics of a woven fabric; whereas in the seaming element shown in FIG. 13, the rows of slits are not offset, but are mutually parallel. For the seaming elements of the invention, both the slits and the embossments respectively can be offset, or both can be aligned, or the slits can be offset while the embossments are aligned, or vice versa.

Figure 4:
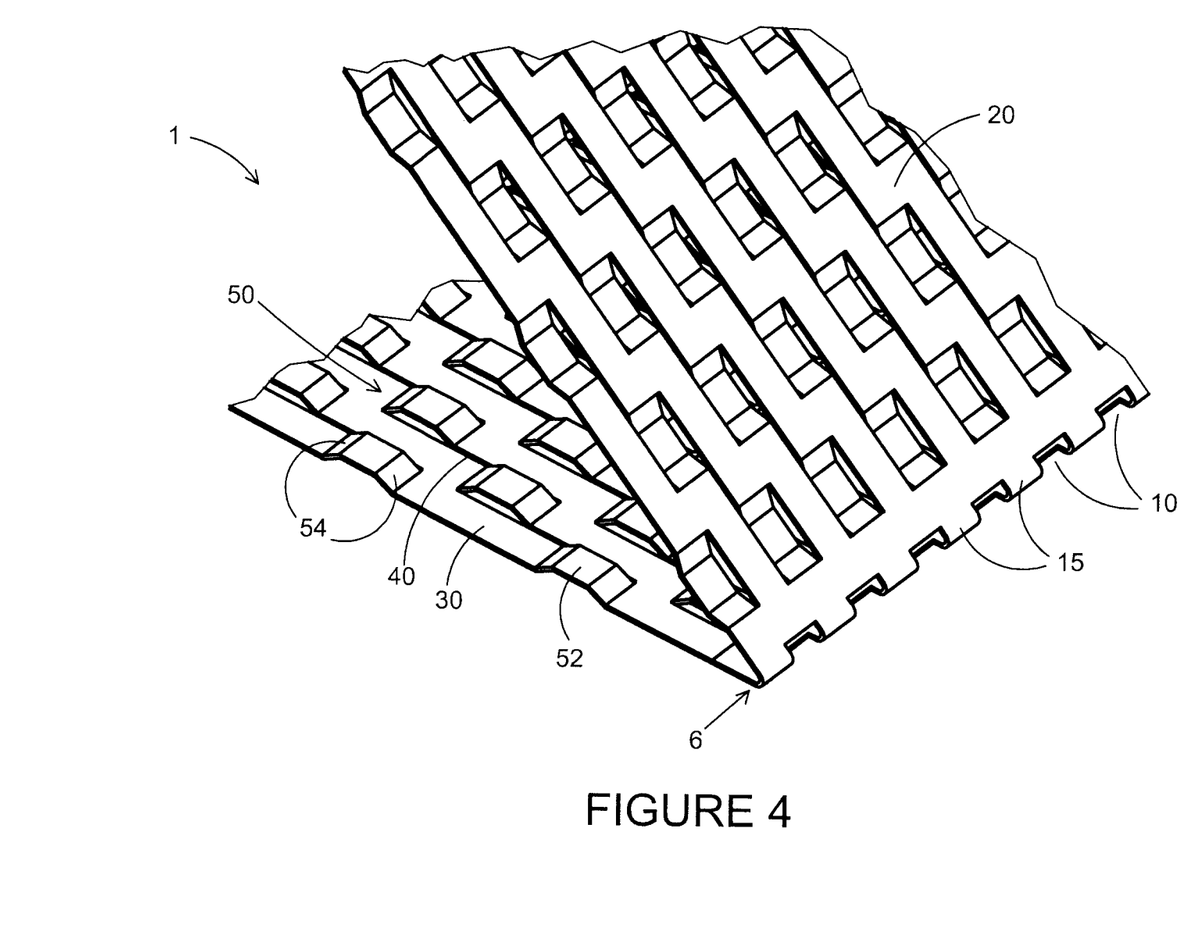
FIG. 4 is a perspective partial view of the fold region of the profiled seaming element of FIG. 3 in a partly folded position.

Referring now to FIG. 4, a portion of a seaming element 1 is shown in a perspective partial view, in a partly folded position, in which seaming element 1 has been folded about fold line 6, bringing end region 20 towards end region 30. By selection of appropriate dimensions for fold region 5 (see FIG. 1), protrusions 50 in end region 20, on folding of seaming element 1, will face and be accommodated between protrusions 50 in end region 30. Optionally, in other embodiments, the profiling patterns and fold region dimensions can be selected so that at least some protrusions 50 can be located so as to contact and be secured to opposing protrusions 50. After folding of seaming element 1, each folded land area 15 has a looped configuration, and the aligned loops contribute to a channel for a securing means, as described further below in relation to FIGS. 7 to 9.

Figure 5:
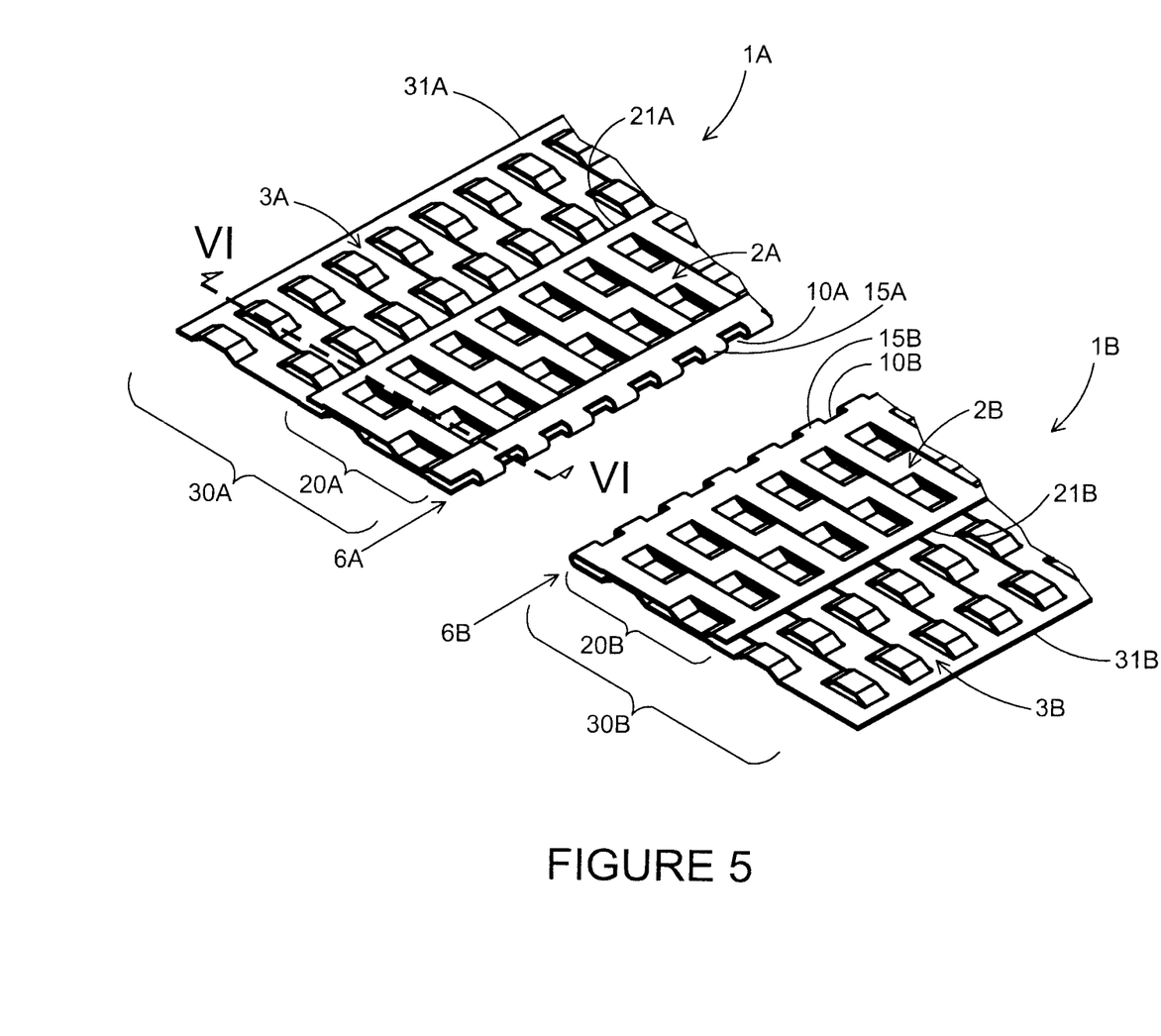
FIG. 5 is a perspective partial view of a disconnected pair of seaming elements in an embodiment of the invention.

FIG. 5 is a perspective partial view of a pair of seaming elements 1A, 1B, showing their relative positions for connection together. Before connection, a pair of seaming elements would generally be secured to the seamable ends of an industrial textile; however, for convenience of understanding, seaming elements 1A and 1B are shown in FIG. 5 in the folded position and ready for securing to the textile, which is not shown. In this folded position, it can be seen that in the direction normal to fold lines 6A, 6B, end regions 20A, 20B are each shorter than corresponding end regions 30A, 30B, so that edge 21A is offset from edge 31A, and edge 21B is offset from edge 31B. It can also be seen that the protrusions 50 on the respective inner surfaces 3A of the folded seaming element 1A, and the protrusions 50 on the respective inner surfaces 3B of the folded seaming element 1B, are securably accommodated on opposing land areas, as described above in relation to FIG. 4.

For connection of the pair of seaming elements 1A, 1B, the two seaming elements are brought together, so that the folded land areas 15A of seaming element 1A are aligned with the apertures 10B of seaming element 1B, and the folded land areas 15B of seaming element 1B are aligned with the apertures 10A of seaming element 1A. Folded land areas 15A are interdigitated with folded land areas 15B, and the aligned looped configurations together define a channel, through which a securing means, such as pintle 60 (see FIG. 8) can be inserted to close the seam.

Figure 6:
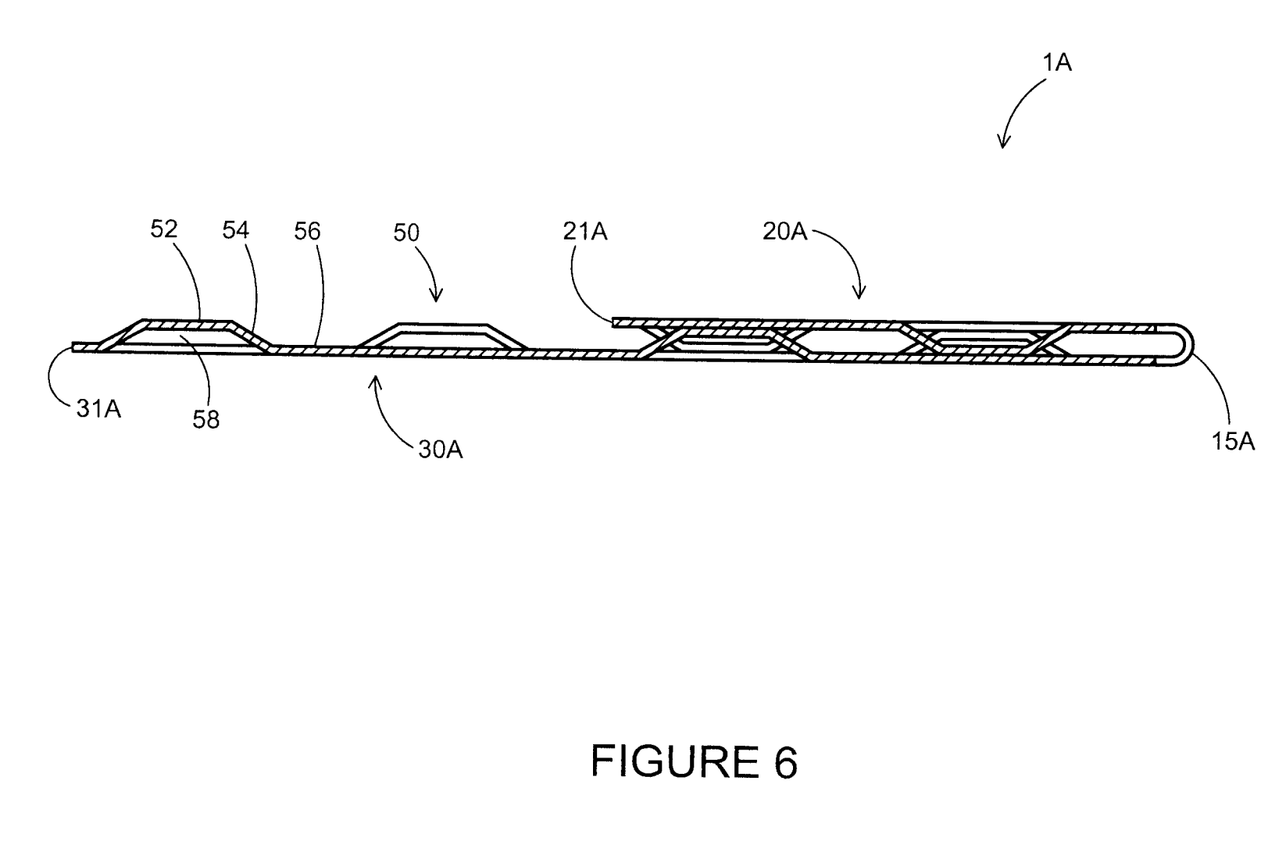
FIG. 6 is a sectional view taken along the lines VI-VI in FIG. 5.

Referring now to FIG. 6, this is a sectional view taken along the lines VI-VI in FIG. 5. End region 20A is folded over end region 30A, so that between folded land areas 15A and edge 21A of end region 20A, protrusions 50 on end region 20A are accommodated between protrusions 50 on end region 30A, whereas in the part of end region 30A extending beyond edge 21A and up to edge 31A, protrusions 50 can compatibly be accommodated by suitable configuration of the textile (not shown) which will be attached to edge 21A and extend over end region 30A.

Figure 7:
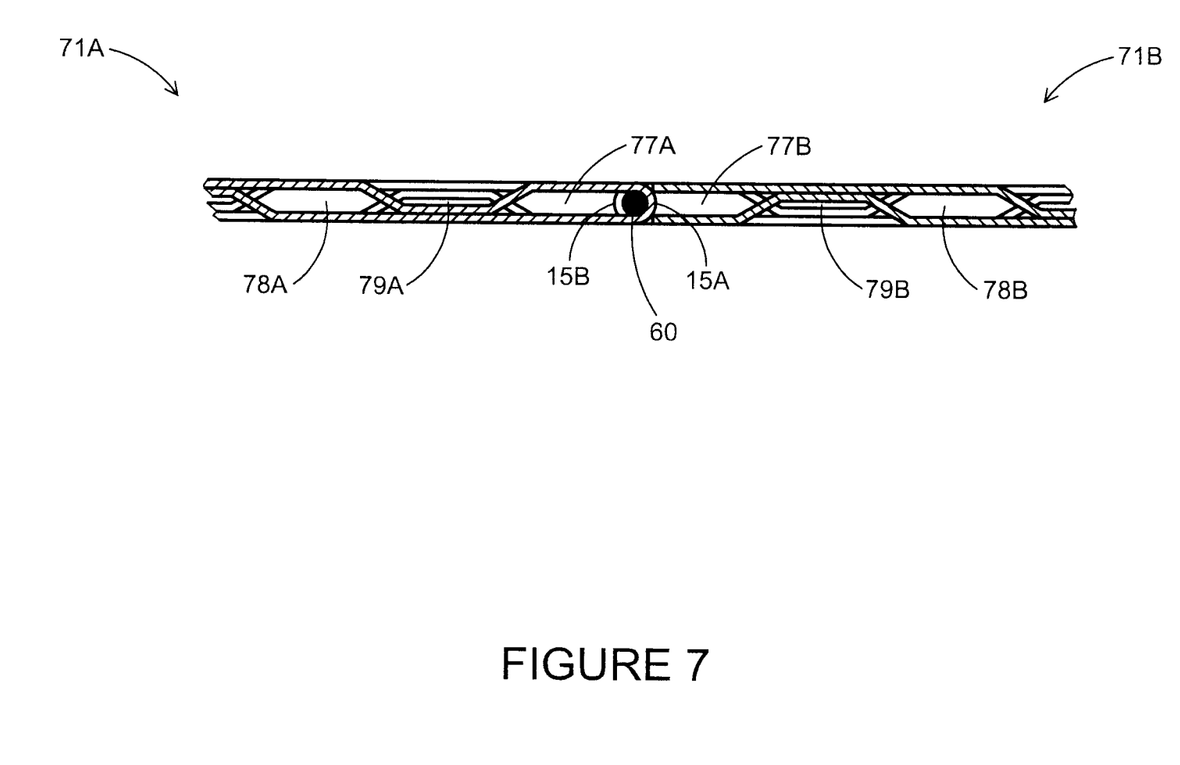
FIG. 7 is a cross-sectional view of a connected pair of seaming elements in an embodiment of the invention.

Referring now to FIG. 7, this is a cross-sectional view of the seam area of an embodiment of the invention, showing a pair of seaming elements 71A, 71B. The respective folded land areas 15A and 15B are shown in the aligned position, secured by pintle 60. It can be seen that the configuration of the elements in this position provides three different types of location for insertion of one or more reinforcement element, i.e. the larger passages 78A, 78B, smaller passages 79A, 79B, and the passages adjacent the outer surfaces of the folded land areas 15A, 15B, i.e. passages 77A, 77B. The insertion of yarns such as monofilaments in passages 77A, 77B, or 78A, 78B can provide increased compression resistance, or a reduction of air permeability, or increased bending stiffness of the fabric as a whole; whereas the insertion of similar yarns in passages 79A, 79B can facilitate the joining of the two layers of the fabric. In addition, pintle tails can be reinserted into passages 77A, 77B, to further secure the seam as well as increasing compression resistance.

Figure 8:
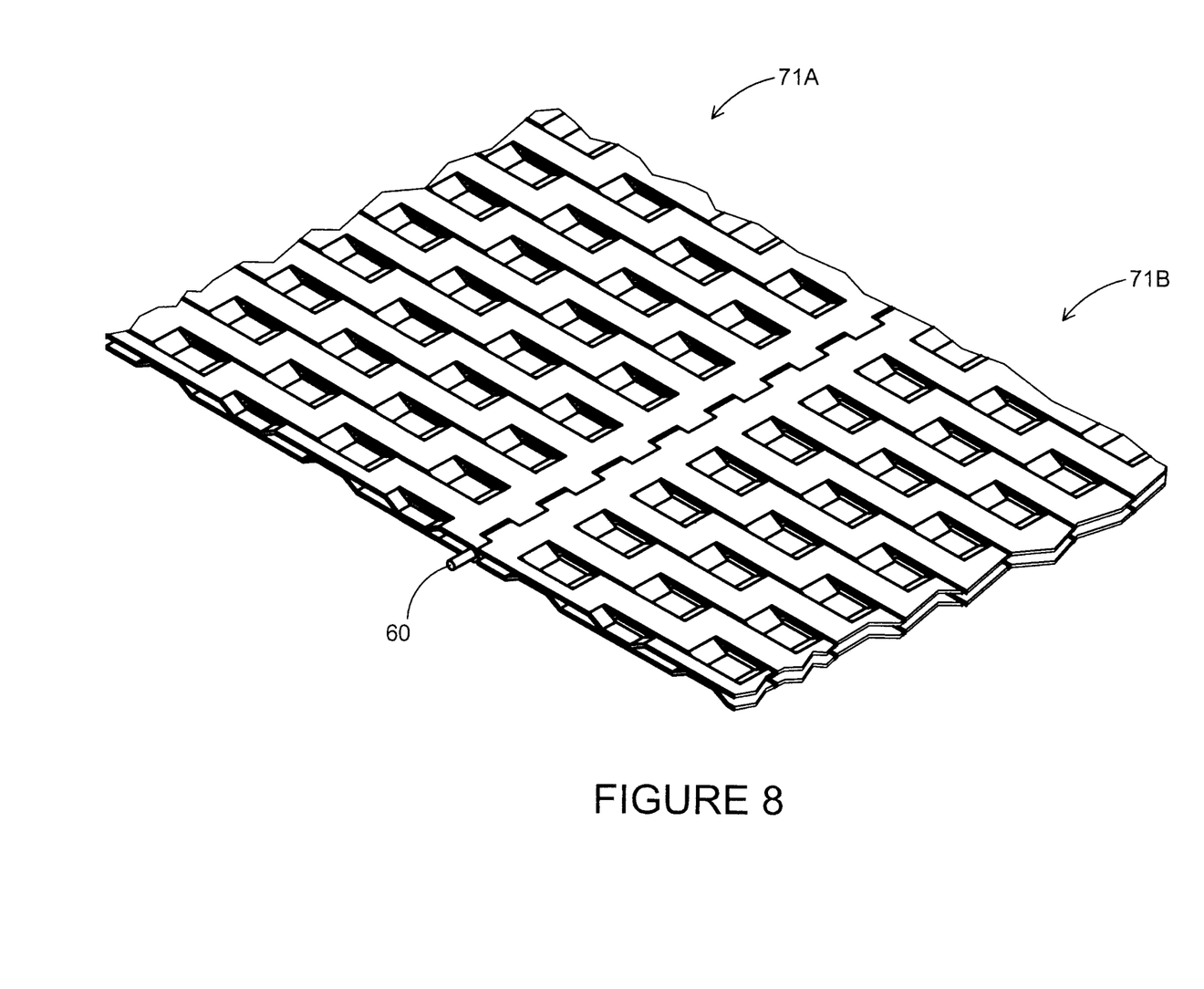
FIG. 8 is a perspective view of a connected pair of seaming elements in an embodiment of the invention.
Figure 9:
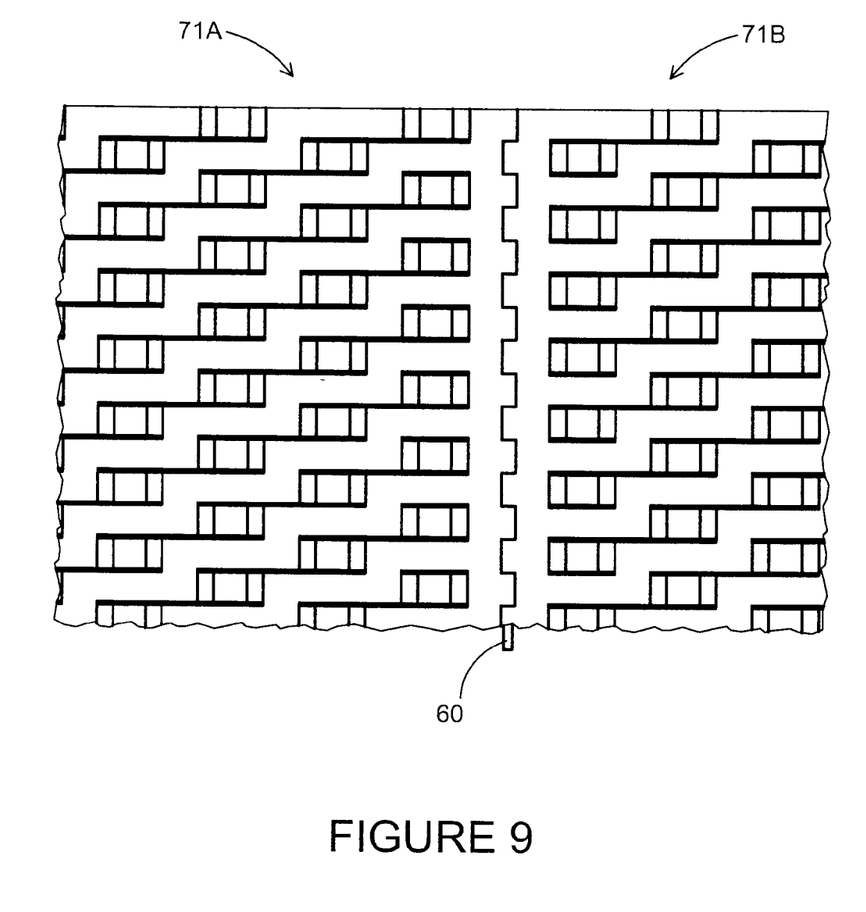
FIG. 9 is a top view of the connected pair of seaming elements of FIG. 9.

FIGS. 8 and 9 are respectively a perspective view and a top view showing the seaming elements 71A, 71B in the position shown in FIG. 7.

Figure 10:
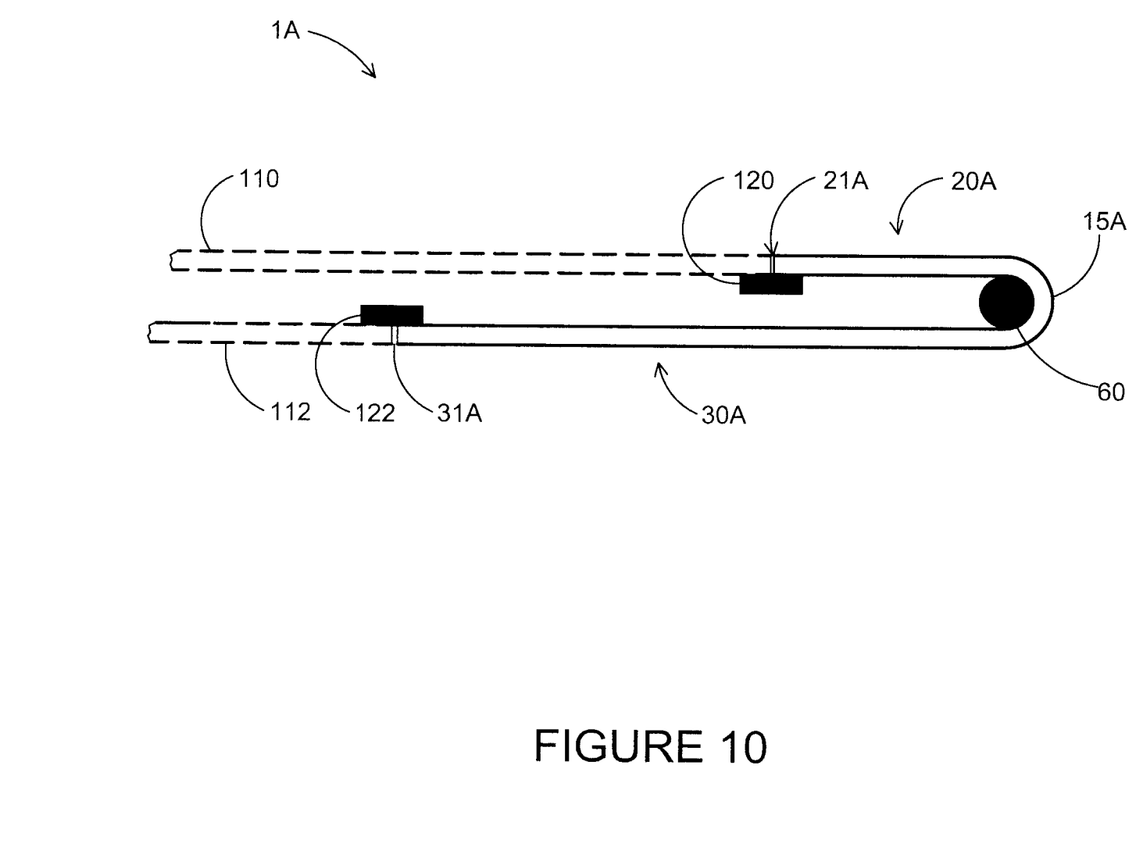
FIG. 10 is a cross-sectional view of a seaming element attached to a two layer textile in an embodiment of the invention.

FIG. 10 is a cross-sectional view of a seaming element 1A attached to a two layer textile in an embodiment of the invention, showing an exemplary method of attachment. First end region 20A is secured at its edge 21A to upper fabric layer 110, by suitable means such as bonding strip 120. Similarly, second end region 30A is secured at its edge 31A to lower fabric layer 112, by suitable means such as bonding strip 122. Strips 120, 122, are preferably constructed of hot melt or laser energy absorbing material, and can be heated or welded in place as appropriate across the pairs of abutting edges, i.e. 21A and 110, and 31A and 112, respectively. As a further option, in place of bonding strips 120, 122, a sheet of an oriented, multi-layer thermoplastic polymer film can be used, comprising at least two thermoplastic polymeric layers in which at least one of the layers includes a radiation absorbing material to provide a weldable outer surface of the polymer material and at least one of the layers provides through transmission of infrared laser energy such as disclosed by Manninen in CA 2,758,622. The film can be provided as a suitably profiled and apertured interior sheath located within the interior of the end regions 31A, 31B or it can be provided as a strip or strips similar to bonding strips 120, 122. As a further alternative, the seaming element 1A, 1B may be constructed entirely of such oriented multi-layer film which includes the laser weldable material. Use of such a film in the latter manner would obviate the need to insert or provide the strips 120, 122, and would thus simplify installation of the elements 1A, 1B to the textile.

Figure 11:
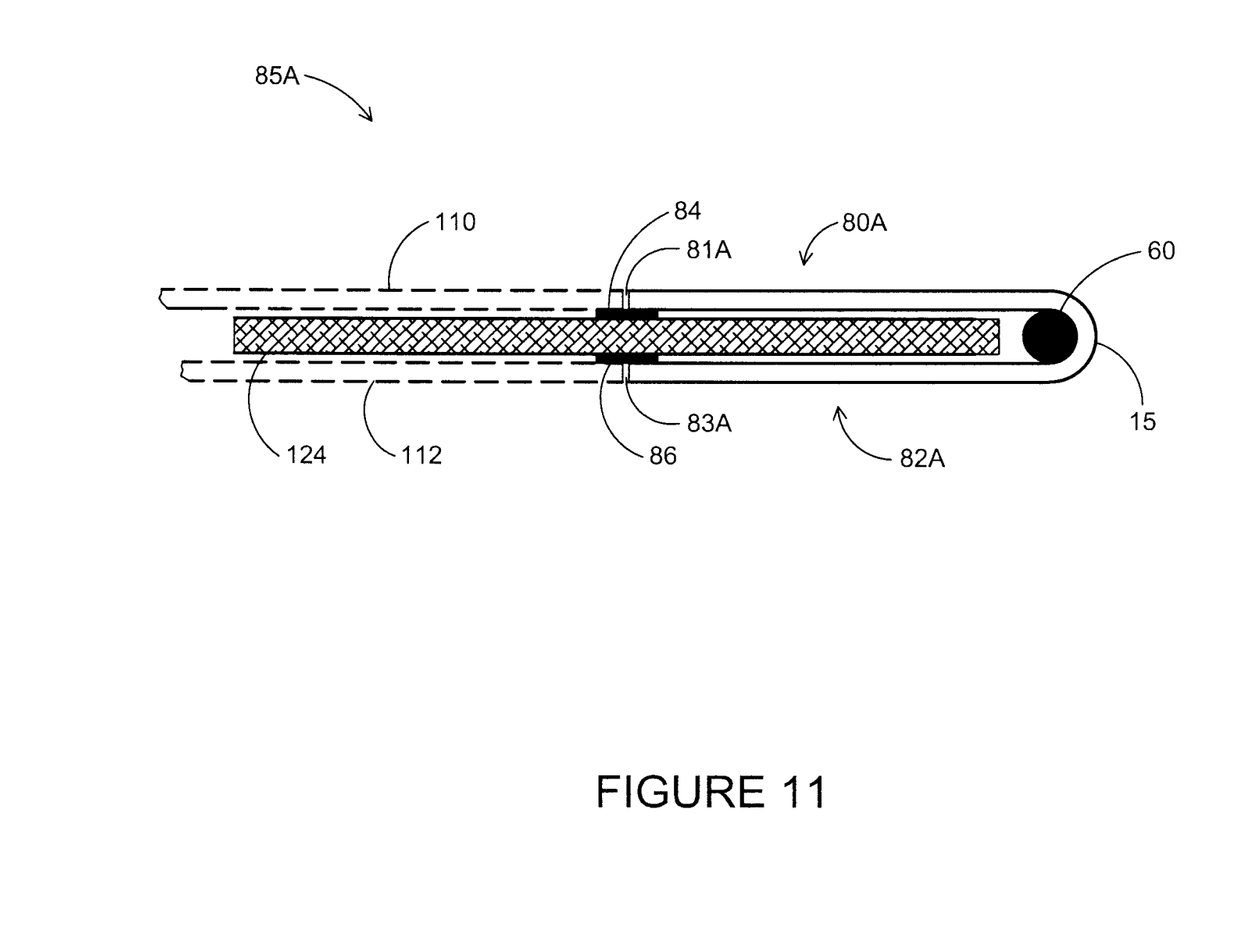
FIG. 11 is a cross-sectional view of a seaming element attached to a three layer textile in an embodiment of the invention.

FIG. 11 is a cross-sectional view of a seaming element 85A, attached to a three layer textile in an embodiment of the invention, showing a further exemplary method of attachment. In this embodiment, end regions 80A, 82A are of equal length, and upper fabric layer 110 is secured to edge 81A of end region 80A, with bonding strip 84; lower fabric layer 112 is secured to edge 83A of end region 82A with bonding strip 86. However, each of end regions 80A, 82A is also secured along its inner surface to third layer 124, provided to the textile body between upper layer 110 and lower layer 112. Layer 124 may be constructed of the same material as layers 110, 112 or it may be comprised of a different material, such as a multi-layer laser weld enabled film as described by Manninen in CA 2,758,622; layer 124 may also be formed of monolayer film including a laser weld enabling material. It will be understood that layer 124 should be profiled and apertured so as to conform to and be matable with the profiling of layers 110, 112. Strips 84, 86 are constructed and secured in place in the same manner as strips 110, 112 shown in FIG. 10.

Figure 12:
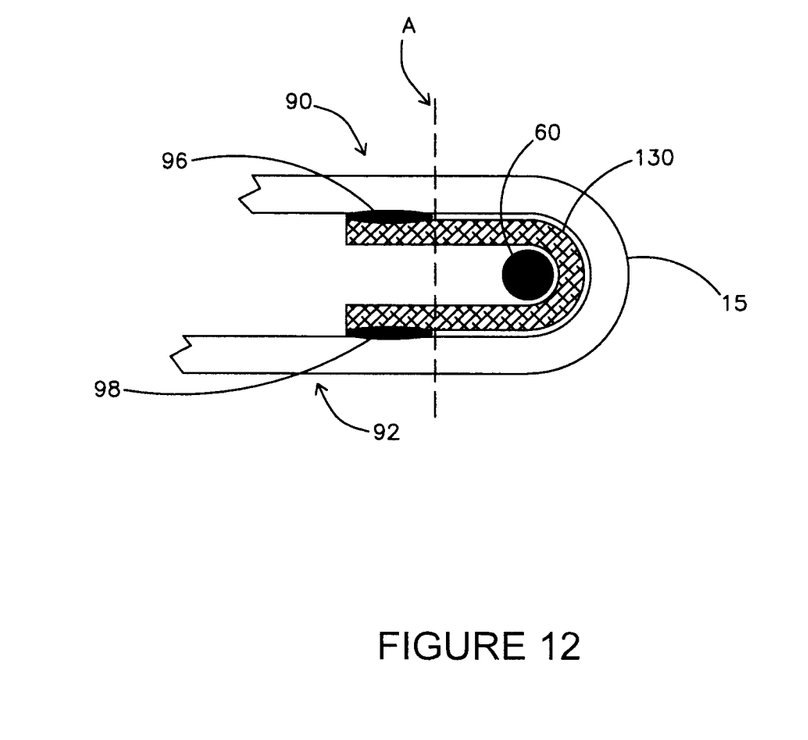
FIG. 12 is a cross-sectional view of a reinforced fold region in an embodiment of the invention.

FIG. 12 is a cross-sectional view of the fold region in an embodiment of the invention; in this embodiment, reinforcement 130 has been provided to the inside of the fold, strengthening the loops 15 and further securing pintle 60. Reinforcement 130 is dimensioned to extend beyond the rearmost part of the apertures formed by loops 150, indicated by line A. At its free ends, reinforcement 130 can be secured to the inner surfaces of layers 90, 92 by any suitable means, shown here as welds 96, 98. Alternatively, as described above, it would be possible to construct the reinforcement 130 from oriented multi-layer film which includes the laser weldable material.

FIG. 13 is a top view of the fold region in a seam area of a textile 200 in an embodiment of the invention. In this embodiment, the seaming elements are provided as an integral part of the film, which is constructed in the manner of WO 2011/069259. At fold region 5, aligned apertures 10 are provided spaced apart equally by land areas which become loops 15. After textile 200 is folded along fold line 5, and a corresponding fold line 5 at the opposing end of the textile, the two prepared folded ends can be brought together, the loops 15 of the two ends interdigitated, to form a channel, and thereafter secured by suitable means such as pintle 60 (see FIG. 7).

I claim:

1. A seaming element for an industrial textile having first and second ends, the seaming element comprising a body having a first end region, a second end region and an intermediate fold region, opposing first and second lateral edges, an outer first surface and an inner second surface, wherein
   (i) each end region comprises a plurality of slits extending from the outer surface through to the inner surface wherein adjacent pairs of the slits define land areas therebetween and selected ones of the land areas comprise protrusions extending from at least one of the outer surface and the inner surface to form a profile to the respective surface;
   (ii) the intermediate fold region comprises a fold line extending between the first and second lateral edges, and a plurality of apertures mutually aligned along the fold line to define a plurality of land areas therebetween such that when the body is folded along the fold line, the land areas form a plurality of loops defining a channel;
(iii) the seaming element is constructed and arranged to be secured at each of the first and second end regions directly to the first end of the industrial textile;
(iv) selected ones of the plurality of loops are alignable and interdigitatable with corresponding loops on a compatible seaming element provided to the second end of the industrial textile, to define a single aligned channel to receive a securing means; and
(v) protrusions on the inner surface of the first end region are selectively secured to the inner surface of the second edge region, and protrusions on the inner surface of the second edge region are selectively secured to the inner surface of the first edge region.

2. A seaming element according to claim 1, wherein the seaming element is constructed of a polymeric film.

3. A seaming element according to claim 2, wherein the polymeric film is constructed of material selected from at least one of polyethylene terephthalate, polyphenylene sulphide, multi-layer laser weld enabled film, and hydrolysis stabilized polymer film.

4. A seaming element according to claim 1, wherein the slits are constructed and arranged to provide aligned rows of protrusions, wherein the protrusions of each row are offset from the protrusions of adjacent rows.

5. A seaming element according to claim 1, wherein the slits are constructed and arranged to provide rows of protrusions in a mutually parallel alignment.

6. A seaming element according to claim 1, wherein the apertures have a configuration selected from substantially rectangular and substantially elliptical.

7. A seaming element according to claim 1, wherein the seaming element is constructed and arranged to be secured to the industrial textile by a means selected from bonding and mechanical means.

8. A seaming element according to claim 7, wherein at least one of the end regions of the seaming element comprises a bonding strip securable to the industrial textile.

9. A seaming element according to claim 1, wherein the industrial textile comprises two outer layers and an interior third layer and the seaming element is constructed and arranged to be secured to the third layer by a means selected from bonding and mechanical means.

10. A seaming element according to claim 1, wherein the securing means is a pintle.

11. A seaming element according to claim 1, further comprising a reinforcement means provided to the inner surface at the fold region.

12. An industrial textile for conveying in an industrial process, having a pair of seamable edges, wherein at least one of the seamable edges comprises a seaming element according to claim 1.

13. An industrial textile according to claim 12, wherein the industrial textile is constructed of a polymeric film.

14. An industrial textile according to claim 13, having a textile body comprising at least one layer having an upper surface and a lower surface; and a plurality of textile body slits extending from the upper surface through to the lower surface wherein adjacent pairs of the textile body slits define land areas therebetween, and selected ones of the land areas comprise protrusions extending from at least one of the upper surface and the lower surface of the layer to form a profile to the respective surface.

15. An industrial textile according to claim 14, wherein the textile body slits are constructed and arranged to provide aligned rows of mutually parallel protrusions, wherein the protrusions of each row are offset from the protrusions of adjacent rows.

16. An industrial textile according to claim 15, comprising at least two layers, and wherein:
(i) the second end region comprises an extended region extending beyond the first end region in a direction measured from the fold line;
(ii) selected ones of protrusions on the inner surface of the first end region are secured to the inner surface of the second end region, and selected ones of protrusions on the inner surface of the second end region are secured to the inner surface of the first end region; and
(iii) selected ones of protrusions on the inner surface of the extended region of the second end region are secured to an inner surface of a first layer of the textile, and protrusions on the inner surface of the first layer of the textile are selectively secured to the inner surface of the extended region of the second end region.

17. An industrial textile according to claim 12, wherein the at least one seaming element is integrally constructed with the textile body.

18. A method of making a seam for an industrial textile, the industrial textile having a pair of seamable edges, the method comprising the steps of:
(a) providing a first seaming element according to claim 1 to the first of the pair of seamable edges;
(b) providing a second seaming element to the second of the pair of seamable edges, the second seaming element comprising a plurality of loops constructed and arranged to be alignable and interdigitatable with the plurality of loops of the first seaming element;
(c) bringing free edges of the first and second seaming elements together, interdigitating the plurality of loops of the first seaming element with the plurality of loops of the second seaming element to define a channel; and
(d) providing a securing means to the channel to secure the seam.

19. A method according to claim 18, wherein the industrial textile comprises at least two layers, the method further comprising selectively securing protrusions on at least one surface selected from the inner surface of the first end region, the inner surface of the second end region and the inner surface of at least one layer of the textile to an opposing one of the at least one surface.

* * * * *